(12) United States Patent
Song

(10) Patent No.: US 11,283,614 B2
(45) Date of Patent: Mar. 22, 2022

(54) INFORMATION VERIFICATION METHOD, APPARATUS, AND DEVICE

(71) Applicant: Alipay (Hangzhou) Information Technology Co., Ltd., Zhejiang (CN)

(72) Inventor: Yitao Song, Zhejiang (CN)

(73) Assignee: Alipay (Hangzhou) Information Technology Co., Ltd., Hangzhou (CN)

(*) Notice: Subject to any disclaimer, the term of this patent is extended or adjusted under 35 U.S.C. 154(b) by 0 days.

(21) Appl. No.: 17/356,233

(22) Filed: Jun. 23, 2021

(65) Prior Publication Data

US 2022/0006632 A1   Jan. 6, 2022

(30) Foreign Application Priority Data

Jul. 3, 2020   (CN) .......................... 202010631687.4

(51) Int. Cl.
  *H04L 9/32* (2006.01)
  *H04L 9/08* (2006.01)
  *H04L 29/06* (2006.01)

(52) U.S. Cl.
  CPC ............ *H04L 9/3213* (2013.01); *H04L 9/083* (2013.01); *H04L 9/0894* (2013.01); *H04L 9/3231* (2013.01); *H04L 63/102* (2013.01)

(58) Field of Classification Search
  CPC ..... H04L 9/3213; H04L 9/083; H04L 9/0894; H04L 63/102; H04L 9/3231
  See application file for complete search history.

(56) References Cited

U.S. PATENT DOCUMENTS

| | | | |
|---|---|---|---|
| 9,870,458 B2* | 1/2018 | Jo | G06F 21/32 |
| 9,996,684 B2* | 6/2018 | Hoyos | H04L 63/10 |
| 10,193,884 B1* | 1/2019 | Griffin | H04L 63/0861 |

(Continued)

FOREIGN PATENT DOCUMENTS

| | | |
|---|---|---|
| CN | 103067385 A | 4/2013 |
| CN | 103188344 A | 7/2013 |

(Continued)

*Primary Examiner* — J. Brant Murphy
(74) *Attorney, Agent, or Firm* — Seed IP Law Group, LLP

(57) ABSTRACT

Implementations of the present specification disclose an information verification method, apparatus, and device. The method includes: receiving a communication verification request of a user; obtaining first biometric feature data inputted by the user, and performing biometric feature verification on the user based on the first biometric feature data; obtaining pre-stored benchmark biometric feature data of the user if the biometric feature verification on the user succeeds, and sending first check information corresponding to the benchmark biometric feature data and a target token corresponding to a pre-stored communication account of the user to a serving end, so that the serving end determines a verification result of the communication account based on the first check information, the target token, and second check information that corresponds to the pre-stored benchmark biometric feature data of the user; and receiving the verification result sent by the serving end, and determining, based on the verification result, whether the communication account of the user is abnormal.

16 Claims, 9 Drawing Sheets

(56) References Cited

U.S. PATENT DOCUMENTS

| | | | | |
|---|---|---|---|---|
| 2002/0031230 | A1* | 3/2002 | Sweet | H04L 63/102 |
| | | | | 380/278 |
| 2015/0046990 | A1* | 2/2015 | Oberheide | G06F 21/45 |
| | | | | 726/6 |
| 2016/0036588 | A1* | 2/2016 | Thackston | G07F 17/3241 |
| | | | | 713/168 |
| 2016/0205096 | A1* | 7/2016 | Hoyos | G06Q 20/40145 |
| | | | | 705/72 |
| 2018/0165781 | A1* | 6/2018 | Rodriguez | H04L 9/3234 |
| 2019/0222422 | A1* | 7/2019 | Purves | G06F 21/6245 |
| 2019/0268332 | A1* | 8/2019 | Wang | G06F 21/44 |
| 2019/0318109 | A1* | 10/2019 | Thomas | H04L 63/101 |
| 2019/0319795 | A1* | 10/2019 | Kong | H04L 9/0869 |
| 2020/0036708 | A1 | 1/2020 | Mars et al. | |
| 2020/0168229 | A1* | 5/2020 | Manchireddy | G10L 15/06 |
| 2020/0177584 | A1* | 6/2020 | Wajs | H04L 63/0861 |
| 2020/0280550 | A1* | 9/2020 | Lindemann | H04L 63/0428 |
| 2020/0287897 | A1* | 9/2020 | Jha | H04L 63/0861 |
| 2020/0293643 | A1* | 9/2020 | Wang | G06K 9/00288 |
| 2020/0382306 | A1* | 12/2020 | Wang | G06Q 20/40145 |
| 2021/0014218 | A1* | 1/2021 | Kurylko | H04L 9/085 |
| 2021/0124815 | A1* | 4/2021 | Rindal | H04L 9/008 |
| 2021/0184857 | A1* | 6/2021 | Chen | H04L 63/126 |

FOREIGN PATENT DOCUMENTS

| | | |
|---|---|---|
| CN | 103491084 A | 1/2014 |
| CN | 103634316 A | 3/2014 |
| CN | 104113549 A | 10/2014 |
| CN | 107026836 A | 8/2017 |
| CN | 107294721 A | 10/2017 |
| CN | 108156119 A | 6/2018 |
| CN | 108429769 A | 8/2018 |
| CN | 110224992 A | 9/2019 |
| CN | 110297922 A | 10/2019 |
| CN | 110830471 A | 2/2020 |
| CN | 111445231 A | 7/2020 |
| WO | 2018/089098 A1 | 5/2018 |

* cited by examiner

INFORMATION VERIFICATION METHOD, APPARATUS, AND DEVICE

BACKGROUND

Technical Field

The present specification relates to the field of computer technologies, and in particular, to an information verification method, apparatus, and device.

Description of the Related Art

With the continuous development of computer technologies, service providers can provide users with more types of services, and the number of users is also increasing. How to verify a communication number (such as a phone number) of a user who uses a current business service has become the focus of attention of the service providers.

At present, the correctness of the communication number of the user currently using the business service can be verified by using an SMS verification code. For example, when the user logs in by using an instant messaging communication application account, the user can send a communication verification request (to verify whether the communication number used by the user belongs to the user) to a service provider by using a terminal device. The service provider can send an SMS message with a verification code to a communication number reserved by the user. After receiving the SMS message, the user can enter the verification code on a login interface, and send the verification code to a server. After verifying the verification code, the server can respond to the communication verification request of the user based on a verification result.

However, due to the rapid increase in the number of users, every time a communication verification request of a user is received, a verification code needs to be generated based on the communication verification request, resulting in high verification costs, low verification efficiency, and poor verification accuracy. Therefore, there is a need for a verification scheme with higher verification efficiency and verification accuracy.

BRIEF SUMMARY

Implementations of the present specification are directed to an information verification method, apparatus, and device, to provide a verification scheme that can improve verification efficiency and verification accuracy.

The above technical solutions are implemented in the implementations of the present specification as follows.

According to a first aspect, an implementation of the present specification provides an information verification method. The method includes: receiving a communication verification request of a user, the communication verification request being used to verify whether a communication account of the user is abnormal; obtaining first biometric feature data inputted by the user, and performing biometric feature verification on the user based on the first biometric feature data; obtaining pre-stored benchmark biometric feature data of the user if the biometric feature verification on the user succeeds, and sending first check information corresponding to the benchmark biometric feature data and a target token corresponding to a pre-stored communication account of the user to a serving end, so that the serving end determines a verification result of the communication account based on the first check information, the target token, and second check information that corresponds to the pre-stored benchmark biometric feature data of the user; and receiving the verification result sent by the serving end, and determining, based on the verification result, whether the communication account of the user is abnormal.

According to a second aspect, an implementation of the present specification provides an information verification method. The method includes: receiving first check information and a target token that are sent by the client, the first check information being check information corresponding to benchmark biometric feature data of a user pre-stored by the client, and the target token being a token corresponding to a communication account of the user pre-stored by the client; and determining a verification result of the communication account based on the first check information, the target token, and second check information that corresponds to the pre-stored benchmark biometric feature data of the user, and sending the verification result to the client, so that the client determines, based on the verification result, whether the communication account of the user is abnormal.

According to a third aspect, an implementation of the present specification provides an information verification apparatus. The apparatus includes: a receiving module, configured to receive a communication verification request of a user, the communication verification request being used to verify whether a communication account of the user is abnormal; an acquisition module, configured to obtain first biometric feature data inputted by the user, and perform biometric feature verification on the user based on the first biometric feature data; a sending module, configured to: obtain pre-stored benchmark biometric feature data of the user if the biometric feature verification on the user succeeds, and send first check information corresponding to the benchmark biometric feature data and a target token corresponding to a pre-stored communication account of the user to a serving end, so that the serving end determines a verification result of the communication account based on the first check information, the target token, and second check information that corresponds to the pre-stored benchmark biometric feature data of the user; and a verification module, configured to receive the verification result sent by the serving end, and determine, based on the verification result, whether the communication account of the user is abnormal.

According to a fourth aspect, an implementation of the present specification provides an information verification apparatus. The apparatus includes: a token receiving module, configured to receive first check information and a target token that are sent by the client, the first check information being check information corresponding to benchmark biometric feature data of a user pre-stored by the client, and the target token being a token corresponding to a communication account of the user pre-stored by the client; and a verification module, configured to determine a verification result of the communication account based on the first check information, the target token, and second check information that corresponds to the pre-stored benchmark biometric feature data of the user, and send the verification result to the client, so that the client determines, based on the verification result, whether the communication account of the user is abnormal.

According to a fifth aspect, an implementation of the present specification provides an information verification device. The information verification device includes: a processor; and a memory, configured to store computer executable instructions, when being executed, the executable instructions enabling the processor to perform the following operations: receiving a communication verification request of a user, the communication verification request being used to verify whether a communication account of the user is abnormal; obtaining first biometric feature data inputted by the user, and performing biometric feature verification on the user based on the first biometric feature data; obtaining pre-stored benchmark biometric feature data of the user if the biometric feature verification on the user succeeds, and sending first check information corresponding to the benchmark biometric feature data and a target token corresponding to a pre-stored communication account of the user to a serving end, so that the serving end determines a verification result of the communication account based on the first check information, the target token, and second check information that corresponds to the pre-stored benchmark biometric feature data of the user; and receiving the verification result sent by the serving end, and determining, based on the verification result, whether the communication account of the user is abnormal.

According to a sixth aspect, an implementation of the present specification provides an information verification device. The information verification device includes: a processor; and a memory, configured to store computer executable instructions, when being executed, the executable instructions enabling the processor to perform the following operations: receiving first check information and a target token that are sent by the client, the first check information being check information corresponding to benchmark biometric feature data of a user pre-stored by the client, and the target token being a token corresponding to a communication account of the user pre-stored by the client; and determining a verification result of the communication account based on the first check information, the target token, and second check information that corresponds to the pre-stored benchmark biometric feature data of the user, and sending the verification result to the client, so that the client determines, based on the verification result, whether the communication account of the user is abnormal.

BRIEF DESCRIPTION OF THE SEVERAL VIEWS OF THE DRAWINGS

To describe the technical solutions in the implementations of the present specification or in the existing technologies more clearly, the following briefly introduces the accompanying drawings for describing the implementations or the existing technologies. Clearly, the accompanying drawings described below show merely some implementations of the present specification, and a person skilled in the art can derive other drawings from these accompanying drawings without creative efforts.

DETAILED DESCRIPTION

Implementations of the present specification provide an information verification method, apparatus, and device.

To make a person skilled in the art better understand the technical solutions in the present specification, the following clearly and completely describes the technical solutions in the implementations of the present specification with reference to the accompanying drawings in the implementations of the present specification. Obviously, the described implementations are merely some implementations of the present specification, but are not all implementations of the present specification. All other implementations obtained by a person of ordinary skill in the art based on the implementations of the present specification shall fall within the protection scope of the present specification.

Implementation 1

Figure 1:
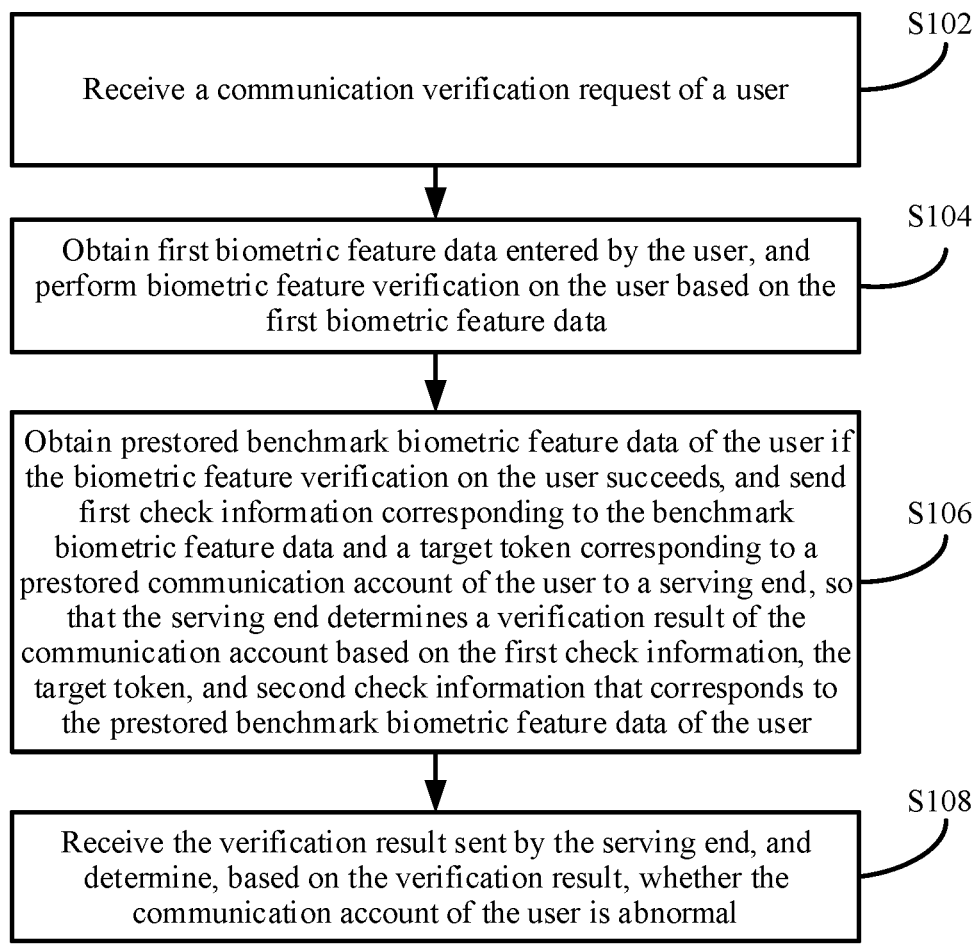
FIG. 1 is a flowchart illustrating an implementation of an information verification method according to the present specification.

As shown in FIG. 1, this implementation of the present specification provides an information verification method. The method can be performed by a client. The client can be a terminal device used by a user or a server. The terminal device can be a device such as a personal computer, or can be a mobile terminal device such as a mobile phone or a tablet computer. The server can be an independent server, or can be a server cluster including a plurality of servers. The method can specifically include the following steps.

S102. Receive a communication verification request of the user.

The communication verification request can be used to verify whether a communication account of the user is abnormal. The communication account can be an account such as a phone number or an email that can be used by the user to communicate with another user.

During implementation, with the continuous development of computer technologies, service providers can provide users with more types of services, and the number of users is also increasing. How to verify a communication number (such as a phone number) of a user who uses a current business service has become the focus of attention of the service providers.

At present, the correctness of the communication number of the user currently using the business service can be verified by using an SMS verification code. For example, when the user logs in by using an instant messaging communication application account, the user can send a communication verification request (to verify whether the communication number used by the user belongs to the user) to a service provider by using a terminal device. The service provider can send an SMS message with a verification code to a communication number reserved by the user. After receiving the SMS message, the user can enter the verification code on a login interface, and send the verification code to a server. After verifying the verification code, the server can respond to the communication verification request of the user based on a verification result. However, due to the rapid increase in the number of users, every time a communication verification request of a user is received, a verification code needs to be generated based on the communication verification request, resulting in high verification costs, low verification efficiency, and poor verification accuracy. Therefore, there is a need for a verification scheme with higher verification efficiency and verification accuracy. As such, this implementation of the present specification provides a technical solution that can be used to resolve the issues described above. Details can be found in the following content.

For example, the communication account is a phone number. In this case, the user can start a certain instant messaging application installed in the client, and can perform an operation of logging in to an account of the instant messaging application by verifying the phone number. In other words, in this case, the client can receive the communication verification request of the user, to verify whether the phone number (namely, the communication account) currently used by the user is a phone number reserved by the user when the user registers in the instant messaging application, that is, to verify whether the currently used phone number is abnormal.

S104. Obtain first biometric feature data inputted by the user, and perform biometric feature verification on the user based on the first biometric feature data.

The first biometric feature data can be biometric feature data used by the use to perform biometric feature verification. For example, the first biometric feature data can be fingerprint data of the user that is used for fingerprint data verification; the first biometric feature data can be iris data of the user that is used for iris data verification; or the first biometric feature data can be facial image data of the user that is used for facial image data verification.

During implementation, when the communication verification request of the user is received, the user may be prompted to perform biometric feature verification (fingerprint characteristic verification is used as an example). For example, "Please verify your Touch ID" can be displayed as prompt information on the client, that is, the user is required to verify fingerprint data on the client. The user can put a corresponding finger on a fingerprint collection component of the client to record the fingerprint data. Therefore, the client can obtain the first biometric feature data inputted by the user, and perform biometric feature verification based on the collected fingerprint data of the user.

S106. Obtain pre-stored benchmark biometric feature data if the biometric feature verification on the user succeeds, and send first check information corresponding to the benchmark biometric feature data and a target token corresponding to a pre-stored communication account of the user to a serving end (e.g., a server), so that the serving end determines a verification result of the communication account based on the first check information, the target token, and second check information that corresponds to the pre-stored benchmark biometric feature data of the user. Pre-stored data, as used in this specification, can refer to data stored, calculated, determined, or otherwise obtained in advance of a corresponding action or operation.

The benchmark biometric feature data can be biometric feature data selected and stored in advance by the user in the client. For example, the benchmark biometric feature data can be iris data, facial image data, or specified fingerprint data recorded and stored in advance by the user. The first check information can be encrypted information obtained by encrypting the benchmark biometric feature data, the first check information can be signature information obtained by signing the benchmark biometric feature data, or the first check information can be verifiable information obtained by verifying the benchmark biometric feature data. The target token can be a token sent by the server to the client.

During implementation, an example in which the user enters the fingerprint data for biometric feature verification in S104 is used. If the biometric feature verification on the fingerprint data inputted by the user succeeds, the pre-stored benchmark biometric feature data (for example, the iris data pre-stored by the user) can be obtained. After the iris data is obtained, a hash value corresponding to the iris data can be generated based on a predetermined hash value generation algorithm, and sent to the serving end as the first check information. In addition, the target token corresponding to the pre-stored communication account of the user can be sent to the serving end, so that the serving end determines a verification result of the communication account based on the received first check information (namely, the hash value of the iris data), the received target token, and the pre-stored second check information (namely, a pre-stored hash value that is of the iris data and that is obtained based on the same hash value generation algorithm).

It should be noted that the first biometric feature data used to perform biometric feature verification on the user and the pre-stored benchmark biometric feature data are data of different biometric features of the user, to be specific, one is data of a fingerprint feature of the user, and the other is data of an iris feature of the user. In practice, alternatively, the first biometric feature data used to perform biometric feature verification on the user and the pre-stored benchmark biometric feature data can be data of a same biometric feature of the user. For example, the first biometric feature data and the benchmark biometric feature data both are data of the fingerprint feature of the user, or both are data of the iris feature of the user. This can be specifically determined based on actual situations.

In addition, the above method for determining the first check information is an implementable determining method in accordance with some embodiments. In an actual application scenario, there may be a plurality of different determining methods. The determining method can be different in different actual application scenarios. This is not specifically limited in this implementation of the present specification.

S108. Receive the verification result sent by the serving end, and determine, based on the verification result, whether the communication account of the user is abnormal.

During implementation, if the received verification result is that the current communication account is inconsistent with the communication account reserved by the user, it can be determined that the current communication account of the user is abnormal. If the received verification result is that the current communication account is consistent with the communication account reserved by the user, it can be determined that the current communication account of the user is normal.

In the information verification method provided in this implementation of the present specification, the first biometric feature data inputted by the user is obtained by receiving the communication verification request of the user, where the communication verification request is used to verify whether the communication account of the user is abnormal; and biometric feature verification is performed on the user based on the first biometric feature data. The pre-stored benchmark biometric feature data of the user is obtained if the biometric feature verification on the user succeeds, and the first check information corresponding to the benchmark biometric feature data and the target token corresponding to the pre-stored communication account of the user are sent to the serving end, so that the serving end determines the verification result of the communication account based on the first check information, the target token, and the second check information that corresponds to the pre-stored benchmark biometric feature data of the user. The verification result sent by the serving end is received, and whether the communication account of the user is abnormal is determined based on the verification result. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 2

Figure 2:
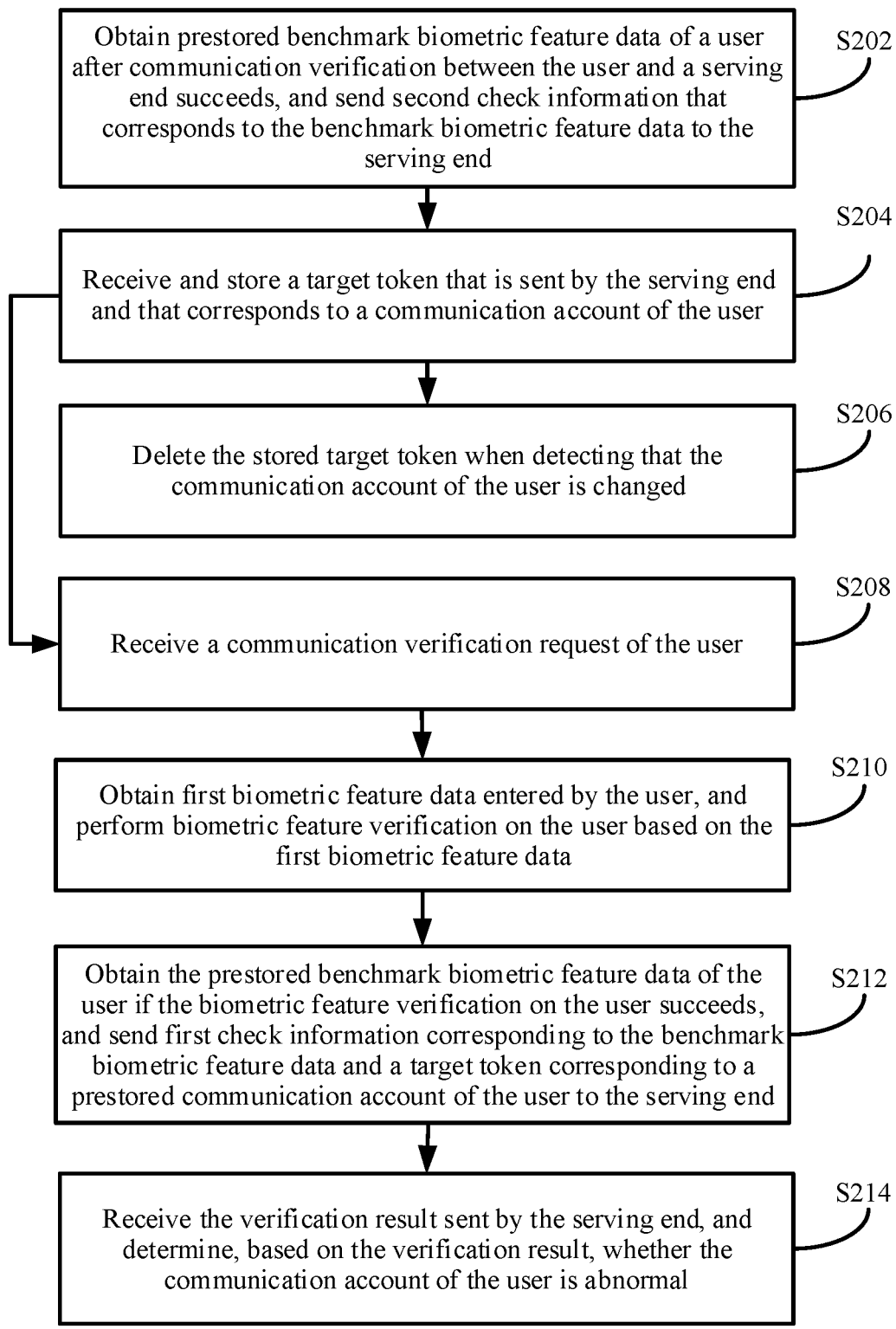
FIG. 2 is a flowchart illustrating an implementation of another information verification method according to the present specification.

As shown in FIG. 2, this implementation of the present specification provides an information verification method. The method can be performed by a client. The client can be a terminal device used by a user or a server. The terminal device can be a device such as a personal computer, or can be a mobile terminal device such as a mobile phone or a tablet computer. The server can be an independent server, or can be a server cluster including a plurality of servers. The method can specifically include the following steps.

S202. Obtain pre-stored benchmark biometric feature data of the user after communication verification between the user and a serving end succeeds, and send second check information that corresponds to the benchmark biometric feature data to the serving end.

During implementation, the communication verification between the user and the serving end can be implemented by using an SMS verification code. After the communication verification succeeds, the client can obtain the pre-stored benchmark biometric feature data of the user, and perform processing (for example, one or more of encrypting processing, verification processing, or signing processing) on the pre-stored benchmark biometric feature data, to obtain the corresponding second check information.

In addition, after the communication verification succeeds, to ensure the accuracy of verification, third biometric feature data of the user can be further obtained, and biometric feature verification is performed by using the third biometric feature data. The benchmark biometric feature data is obtained after the biometric feature verification succeeds, and the second check information obtained based on the benchmark biometric feature data is sent to the serving end.

The communication verification is performed on the user by using the SMS verification code. Furthermore, there can be a plurality of communication verification methods. The communication verification methods can be different in different actual application scenarios. This is not specifically limited in this implementation of the present technology.

S204. Receive and store a target token that is sent by the serving end and that corresponds to a communication account of the user.

The target token can be a token generated by the serving end based on information about the client of the user (for example, identification information of the client) and the communication account of the user, and the target token can be bound to the communication account of the user.

During implementation, after the communication verification between the user and the serving end succeeds, the serving end can generate and store the corresponding target token based on the communication account of the user and the information about the client, and send the target token to the client.

S206. Delete the stored target token when detecting that the communication account of the user is changed.

During implementation, for example, when the user removes a subscriber identity module (SIM) from the client, the client can sense that the communication account is changed, and can delete the stored target token.

In addition, the client can be a client on which a plurality of SIM cards can be installed. If the user removes the installed one or more SIM cards from the client, a target token corresponding to each removed SIM card can be determined, and then the determined target token is deleted.

S208. Receive a communication verification request of the user.

S210. Obtain first biometric feature data inputted by the user, and perform biometric feature verification on the user based on the first biometric feature data.

S212. Obtain the pre-stored benchmark biometric feature data of the user if the biometric feature verification on the user succeeds, and send first check information corresponding to the benchmark biometric feature data and a target token corresponding to a pre-stored communication account of the user to the serving end.

The method for determining the first check information can be the same as the method for determining the second check information. For example, if the second check information is a hash value obtained based on hash algorithm 1 and the benchmark biometric feature data, the first check information can also be a hash value determined based on the same hash algorithm 1 and benchmark biometric feature data.

S214. Receive a verification result sent by the serving end, and determine, based on the verification result, whether the communication account of the user is abnormal.

For a specific processing process of S208 to S214, references can be made to the related content of S102 to S108 in Implementation 1. Details are omitted herein for simplicity.

In the information verification method provided in this implementation of the present specification, the first biometric feature data inputted by the user is obtained by receiving the communication verification request of the user, where the communication verification request is used to verify whether the communication account of the user is abnormal; and biometric feature verification is performed on the user based on the first biometric feature data. The pre-stored benchmark biometric feature data of the user is obtained if the biometric feature verification on the user succeeds, and the first check information corresponding to the benchmark biometric feature data and the target token corresponding to the pre-stored communication account of the user are sent to the serving end, so that the serving end determines the verification result of the communication account based on the first check information, the target token, and the second check information that corresponds to the pre-stored benchmark biometric feature data of the user. The verification result sent by the serving end is received, and whether the communication account of the user is abnormal is determined based on the verification result. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 3

Figure 3:
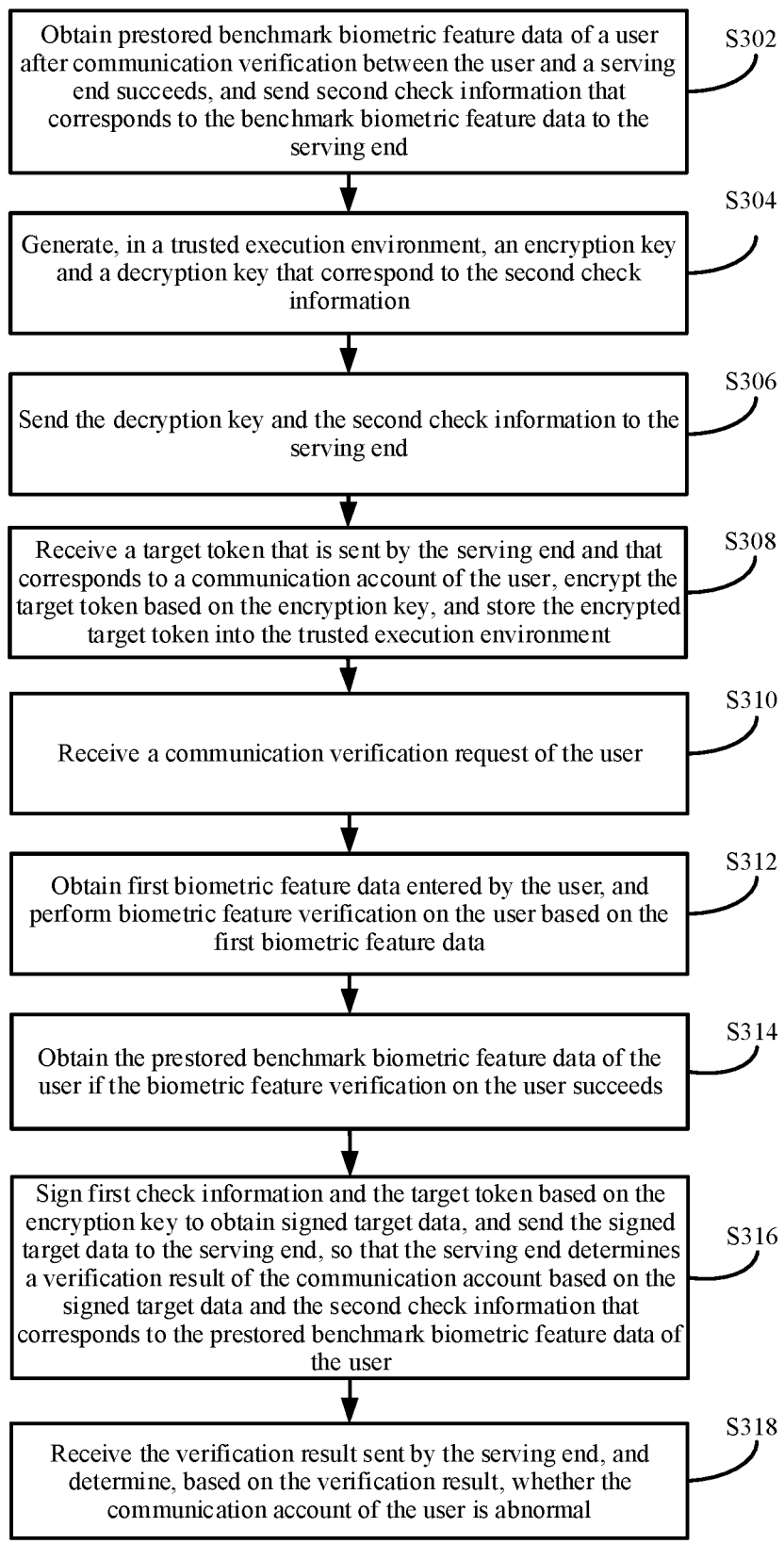
FIG. 3 is a flowchart illustrating an implementation of another information verification method according to the present specification.

As shown in FIG. 3, this implementation of the present specification provides an information verification method. The method can be performed by a client. The client can be a terminal device used by a user or a server. The terminal device can be a device such as a personal computer, or can be a mobile terminal device such as a mobile phone or a tablet computer. The server can be an independent server, or can be a server cluster including a plurality of servers. The method can specifically include the following steps.

S302. Obtain pre-stored benchmark biometric feature data of the user after communication verification between the user and a serving end succeeds, and send second check information that corresponds to the benchmark biometric feature data to the serving end.

For a specific processing process of S302, references can be made to the related content of S202 in Implementation 2. Details are omitted herein for simplicity.

S304. Generate, in a trusted execution environment (TEE), an encryption key and a decryption key that correspond to the second check information.

The TEE can be a secure zone that runs independently in the client, used to ensure confidentiality and integrity of data stored in the TEE. That is, the TEE can be a secure data processing environment isolated from another environment. Processing performed in the TEE, data generated in a data processing process in the TEE, and the like cannot be known by any party outside the TEE.

During implementation, there can be a plurality of pieces of benchmark biometric feature data that are stored in the client and that correspond to the second check information. The generated encryption key and decryption key can be bound to the one or more pieces of benchmark biometric feature data. If new benchmark biometric feature data is added to the client or one or more pieces of stored benchmark biometric feature data is deleted from the client (that is, the benchmark biometric feature data stored in the client is changed), the corresponding encryption key and decryption key can be in an invalid state.

S306. Send the decryption key and the second check information to the serving end.

S308. Receive a target token that is sent by the serving end and that corresponds to a communication account of the user, encrypt the target token based on the encryption key, and store the encrypted target token into the TEE.

During implementation, the encrypted target token can be stored at a position that is in the TEE and that corresponds to the encryption key and the decryption key.

S310. Receive a communication verification request of the user.

S312. Obtain first biometric feature data inputted by the user, and perform biometric feature verification on the user based on the first biometric feature data.

S314. Obtain the pre-stored benchmark biometric feature data of the user if the biometric feature verification on the user succeeds.

For a specific processing process of S310 to S314, references can be made to the related content of S102 to S106 in Implementation 1. Details are omitted herein for simplicity.

S316. Sign the first check information and the target token based on the encryption key to obtain signed target data, and send the signed target data to the serving end, so that the serving end determines a verification result of the communication account based on the signed target data and the second check information that corresponds to the pre-stored benchmark biometric feature data of the user.

During implementation, before signing, the encrypted stored target token can be decrypted based on the decryption key to obtain the decrypted target token. Then, the first check information and the decrypted target token are signed based on the encryption key to obtain the signed target data, and the signed target data and the decrypted target token can be sent to the serving end.

S318. Receive the verification result sent by the serving end, and determine, based on the verification result, whether the communication account of the user is abnormal.

For a specific processing process of S318, references can be made to the related content of S108 in Implementation 1. Details are omitted herein for simplicity.

In the information verification method provided in this implementation of the present specification, the first biometric feature data inputted by the user is obtained by receiving the communication verification request of the user, where the communication verification request is used to verify whether the communication account of the user is abnormal; and biometric feature verification is performed on the user based on the first biometric feature data. The pre-stored benchmark biometric feature data of the user is obtained if the biometric feature verification on the user succeeds, and the first check information corresponding to the benchmark biometric feature data and the target token corresponding to the pre-stored communication account of the user are sent to the serving end, so that the serving end determines the verification result of the communication account based on the first check information, the target token, and the second check information that corresponds to the pre-stored benchmark biometric feature data of the user. The verification result sent by the serving end is received, and whether the communication account of the user is abnormal is determined based on the verification result. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 4

Figure 4:
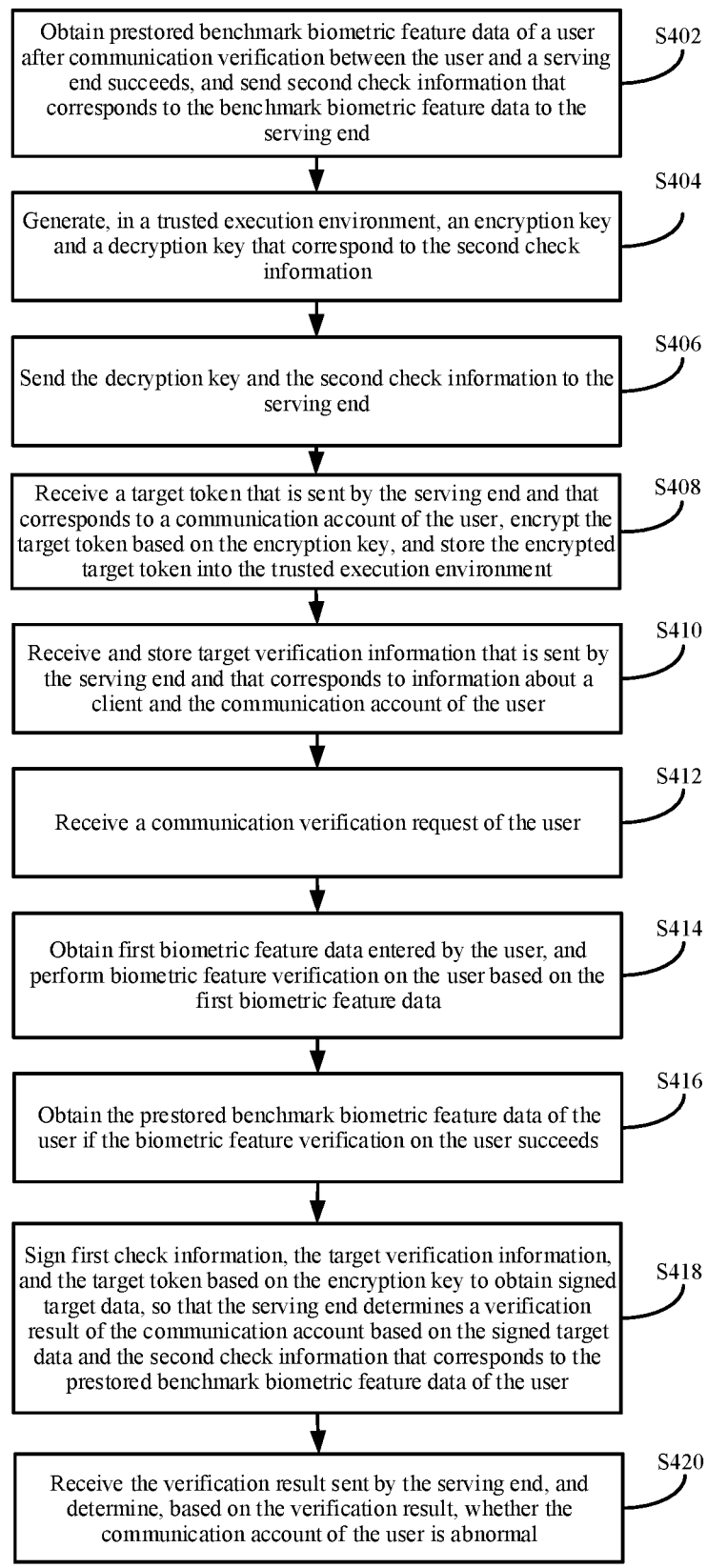
FIG. 4 is a flowchart illustrating an implementation of another information verification method according to the present specification.

As shown in FIG. 4, this implementation of the present specification provides an information verification method.

The method can be performed by a client. The client can be a terminal device used by a user or a server. The terminal device can be a device such as a personal computer, or can be a mobile terminal device such as a mobile phone or a tablet computer. The server can be an independent server, or can be a server cluster including a plurality of servers. The method can specifically include the following steps.

S402. Obtain pre-stored benchmark biometric feature data of the user after communication verification between the user and a serving end succeeds, and send second check information that corresponds to the benchmark biometric feature data to the serving end.

S404. Generate, in a TEE, an encryption key and a decryption key that correspond to the second check information.

S406. Send the decryption key and the second check information to the serving end.

S408. Receive a target token that is sent by the serving end and that corresponds to a communication account of the user, encrypt the target token based on the encryption key, and store the encrypted target token into the TEE.

For a specific processing process of S402 to S408, references can be made to the related content of S302 to S308 in Implementation 3. Details are omitted herein for simplicity.

S410. Receive and store target verification information that is sent by the serving end and that corresponds to information about the client and the communication account of the user.

The target verification information can be generated based on a predetermined random number generation algorithm.

During implementation, the server can generate, based on the predetermined random number generation algorithm, a random number that has a predetermined number of bits and that corresponds to the information about the client and the communication account of the user, determine the random number as the target verification information, and send the target verification information to the client.

S412. Receive a communication verification request of the user.

S414. Obtain first biometric feature data inputted by the user, and perform biometric feature verification on the user based on the first biometric feature data.

S416. Obtain the pre-stored benchmark biometric feature data of the user if the biometric feature verification on the user succeeds.

For a specific processing process of S412 to S416, references can be made to the related content of S102 to S106 in Implementation 1. Details are omitted herein for simplicity.

S418. Sign the first check information, the target verification information, and the target token based on the encryption key to obtain signed target data, so that the serving end determines a verification result of the communication account based on the signed target data and the second check information that corresponds to the pre-stored benchmark biometric feature data of the user.

S420. Receive the verification result sent by the serving end, and determine, based on the verification result, whether the communication account of the user is abnormal.

For a specific processing process of S420, references can be made to the related content of S108 in Implementation 1. Details are omitted herein for simplicity.

In the information verification method provided in this implementation of the present specification, the first biometric feature data inputted by the user is obtained by receiving the communication verification request of the user, where the communication verification request is used to verify whether the communication account of the user is abnormal; and biometric feature verification is performed on the user based on the first biometric feature data. The pre-stored benchmark biometric feature data of the user is obtained if the biometric feature verification on the user succeeds, and the first check information corresponding to the benchmark biometric feature data and the target token corresponding to the pre-stored communication account of the user are sent to the serving end, so that the serving end determines the verification result of the communication account based on the first check information, the target token, and the second check information that corresponds to the pre-stored benchmark biometric feature data of the user. The verification result sent by the serving end is received, and whether the communication account of the user is abnormal is determined based on the verification result. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 5

Figure 5:
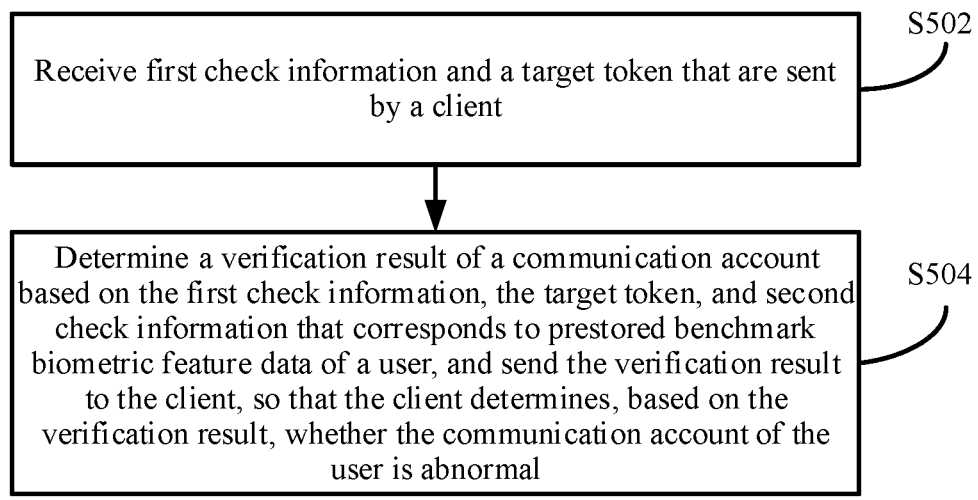
FIG. 5 is a flowchart illustrating an implementation of another information verification method according to the present specification.

As shown in FIG. 5, this implementation of the present specification provides an information verification method. The method can be performed by a serving end. The serving end can be a server providing a communication verification service for a user. The server can be an independent server, or can be a server cluster including a plurality of servers. The method can specifically include the following steps.

S502. Receive first check information and a target token that are sent by a client.

The first check information can be check information corresponding to benchmark biometric feature data of the user pre-stored by the client, and the target token can be a token corresponding to a communication account of the user pre-stored by the client.

S504. Determine a verification result of the communication account based on the first check information, the target token, and second check information that corresponds to the pre-stored benchmark biometric feature data of the user, and send the verification result to the client, so that the client determines, based on the verification result, whether the communication account of the user is abnormal.

During implementation, a first token corresponding to information about the client can be obtained from stored tokens, matching detection is performed on the first token and the target token, and matching detection is performed on the first check information and the second check information. If the first check information successfully matches the second check information and the first token successfully matches the target token, it can be determined that the corresponding verification result is that the communication account is not abnormal.

In addition, when the target token is verified, first client information corresponding to the target token can be further determined by using a stored correspondence between a token and client information, and matching detection is performed on the first client information and the received information about the client.

In the information verification method provided in this implementation of the present specification, the first check information and the target token that are sent by the client are received, where the first check information is check information corresponding to the benchmark biometric feature data of the user pre-stored by the client, and the target token is a token corresponding to the communication account of the user pre-stored by the client. The verification result of the communication account is determined based on the first check information, the target token, and the second check information that corresponds to the pre-stored benchmark biometric feature data of the user, and the verification result is sent to the client, so that the client determines, based on the verification result, whether the communication account of the user is abnormal. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 6

Figure 6:
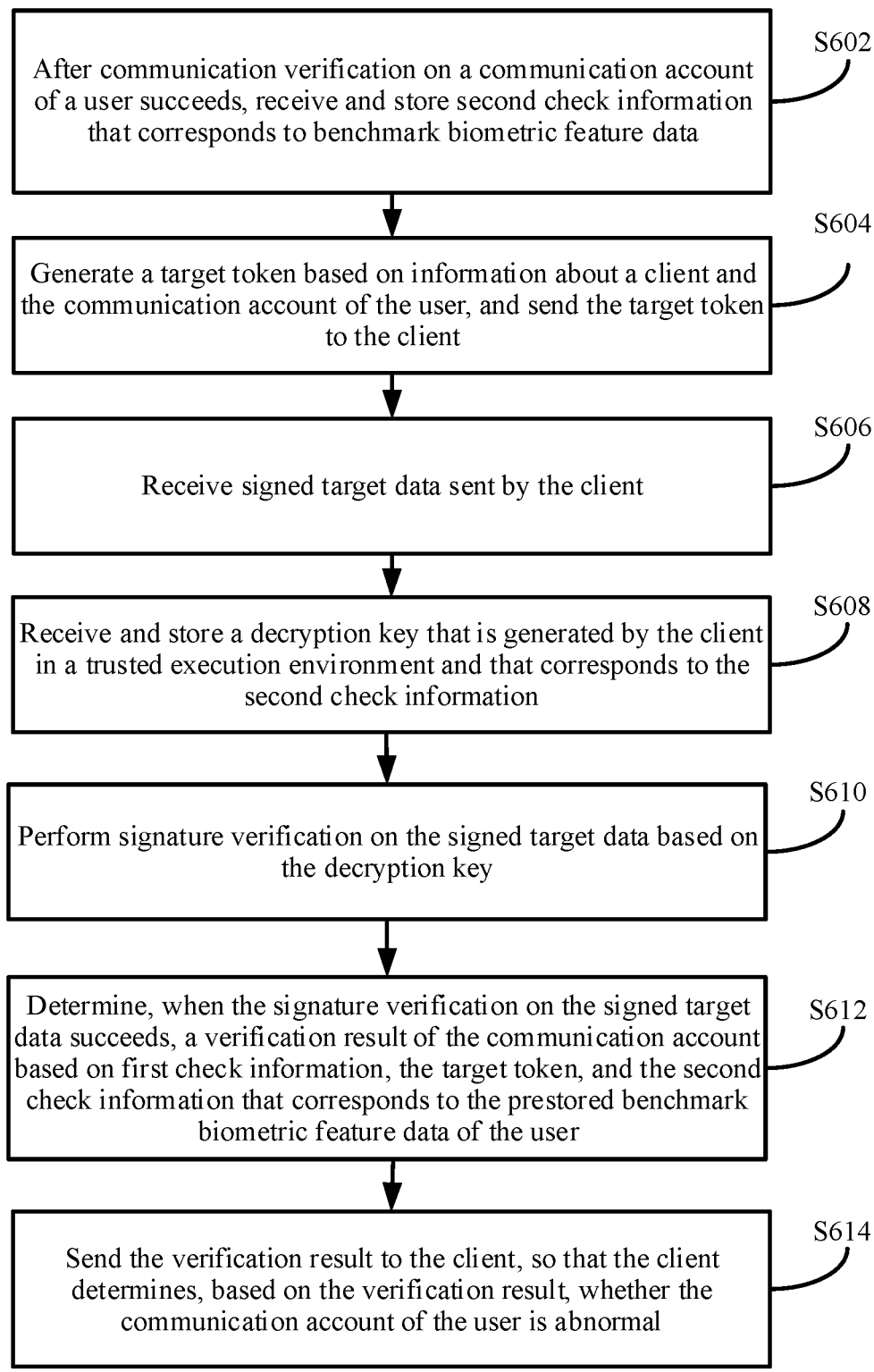
FIG. 6 is a flowchart illustrating an implementation of another information verification method according to the present specification.

As shown in FIG. 6, this implementation of the present specification provides an information verification method. The method can be performed by a serving end. The serving end can be a server providing a communication verification service for a user. The server can be an independent server, or can be a server cluster including a plurality of servers. The method can specifically include the following steps.

S602. After communication verification on a communication account of the user succeeds, receive and store second check information that corresponds to benchmark biometric feature data.

S604. Generate a target token based on information about a client and the communication account of the user, and send the target token to the client.

During implementation, there may be a plurality of methods for generating the target token. The generation methods can be different in different actual application scenarios. This is not specifically limited in this implementation of the present specification.

S606. Receive signed target data sent by the client, where the signed target data is data obtained after the client signs first check information and the target token based on an encryption key.

The encryption key can be a key that is generated by the client in a TEE and that corresponds to a decryption key.

S608. Receive and store the decryption key that is generated by the client in the TEE and that corresponds to the second check information.

S610. Perform signature verification on the signed target data based on the decryption key.

During implementation, the serving end can decrypt the signed target data by using the decryption key, to obtain decrypted first check information and target token. Then, matching detection is performed on the decrypted first check information and target token and the received first check information and target token. If the matching succeeds, it indicates that the first check information and the target token have not been tampered with during transmission.

S612. Determine, when the signature verification on the signed target data succeeds, a verification result of the communication account based on the first check information, the target token, and the second check information that corresponds to the pre-stored stored benchmark biometric feature data of the user.

During implementation, when the signature verification on the signed target data succeeds and the first check information successfully matches the second check information, the verification result can be determined based on the target token, the information about the client, and a communication number of the user.

The server can store a correspondence among a token, client information, and a communication number. A communication number and second client information that corresponds to the target token can be obtained by using the correspondence, and matching detection is performed on the second client information and the information about the client that receives the communication verification request, and matching detection is also performed on the first communication number and a communication number that corresponds to the communication verification request. As such, not only the communication number can be verified, but also the client can be verified, thereby ensuring verification accuracy.

S614. Send the verification result to the client, so that the client determines, based on the verification result, whether the communication account of the user is abnormal.

In the information verification method provided in this implementation of the present specification, the first check information and the target token that are sent by the client are received, where the first check information is check information corresponding to the benchmark biometric feature data of the user pre-stored by the client, and the target token is a token corresponding to the communication account of the user pre-stored by the client. The verification result of the communication account is determined based on the first check information, the target token, and the second check information that corresponds to the pre-stored benchmark biometric feature data of the user, and the verification result is sent to the client, so that the client determines, based on the verification result, whether the communication account of the user is abnormal. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 7

Figure 7:
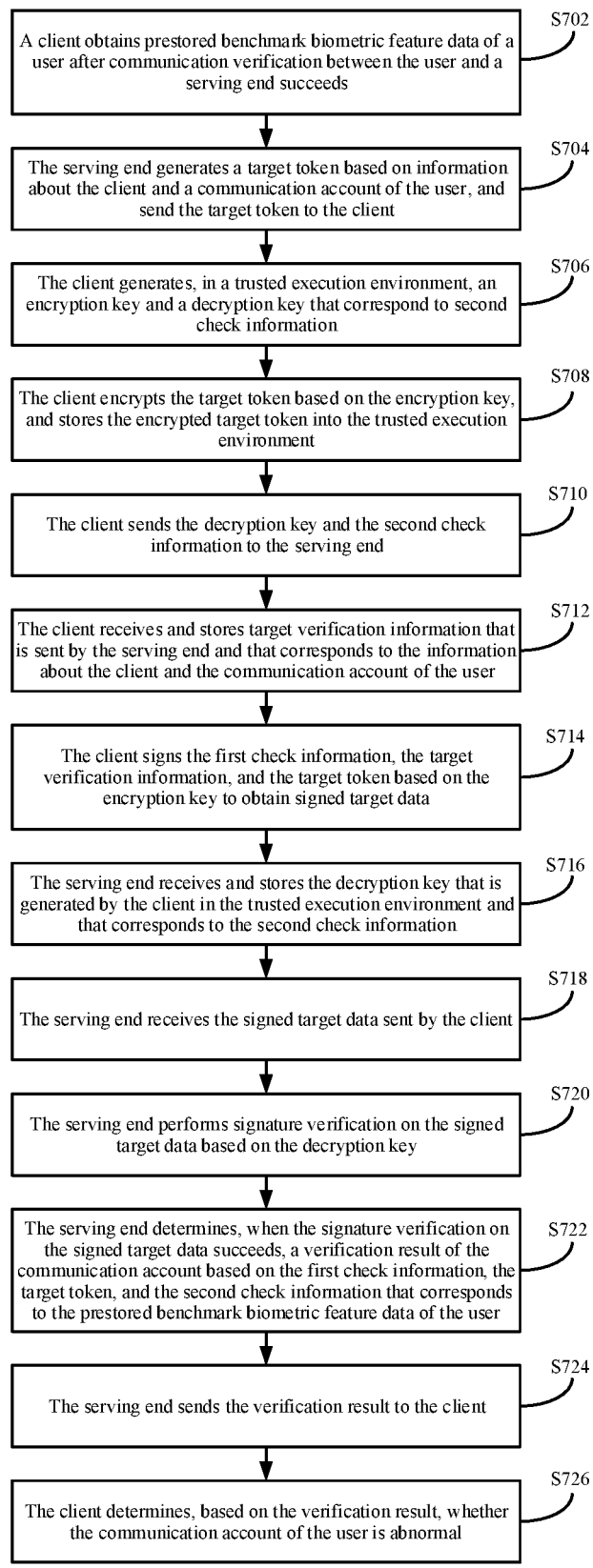
FIG. 7 is a flowchart illustrating an implementation of another information verification method according to the present specification.

As shown in FIG. 7, this implementation of the present specification provides an information verification method. The method can be performed by a client and a serving end. The client can be a terminal device used by a user or a server. The terminal device can be a device such as a personal computer, or can be a mobile terminal device such as a mobile phone or a tablet computer. The server can be an independent server, or can be a server cluster including a plurality of servers. The serving end can be a server providing a communication verification service for the user. The server can be an independent server, or can be a server cluster including a plurality of servers. The method can specifically include the following steps.

S702. The client obtains pre-stored benchmark biometric feature data of the user after communication verification between the user and the serving end succeeds.

S704. The serving end generates a target token based on information about the client and a communication account of the user, and sends the target token to the client.

S706. The client generates, in a TEE, an encryption key and a decryption key that correspond to second check information.

S708. The client encrypts the target token based on the encryption key, and stores the encrypted target token into the TEE.

S710. The client sends the decryption key and the second check information to the serving end.

S712. The client receives and stores target verification information that is sent by the serving end and that corresponds to the information about the client and the communication account of the user.

The target verification information may be a random number that has a predetermined number of bits, that is generated by the serving end based on a predetermined random number generation algorithm, and that corresponds to the information about the client and the communication account of the user.

During implementation, after the communication verification between the user and the serving end succeeds, the serving end can generate the target verification information, and sends the target verification information to the client, thereby improving accuracy of a subsequent verification operation.

S714. The client signs the first check information, the target verification information, and the target token based on the encryption key to obtain signed target data.

S716. The serving end receives and stores the decryption key that is generated by the client in the TEE and that corresponds to the second check information.

S718. The serving end receives the signed target data sent by the client.

S720. The serving end performs signature verification on the signed target data based on the decryption key.

S722. The serving end determines, when the signature verification on the signed target data succeeds, a verification result of the communication account based on the first check information, the target token, and the second check information that corresponds to the pre-stored benchmark biometric feature data of the user.

During implementation, when the signature verification on the signed target data succeeds, the serving end can perform matching detection on the first check information and the second check information, and perform matching detection on the target token, the information about the client, and the communication number of the user. In addition, the serving end can perform matching detection on the target verification information and pre-stored verification information, and then can determine a corresponding verification result based on the above three matching detection results.

S724. The serving end sends the verification result to the client.

S726. The client determines, based on the verification result, whether the communication account of the user is abnormal.

In the information verification method provided in this implementation of the present specification, the first biometric feature data inputted by the user is obtained by receiving the communication verification request of the user, where the communication verification request is used to verify whether the communication account of the user is abnormal; and biometric feature verification is performed on the user based on the first biometric feature data. The pre-stored benchmark biometric feature data of the user is obtained if the biometric feature verification on the user succeeds, and the first check information corresponding to the benchmark biometric feature data and the target token corresponding to the pre-stored communication account of the user are sent to the serving end, so that the serving end determines the verification result of the communication account based on the first check information, the target token, and the second check information that corresponds to the pre-stored benchmark biometric feature data of the user. The verification result sent by the serving end is received, and whether the communication account of the user is abnormal is determined based on the verification result. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 8

Figure 8:
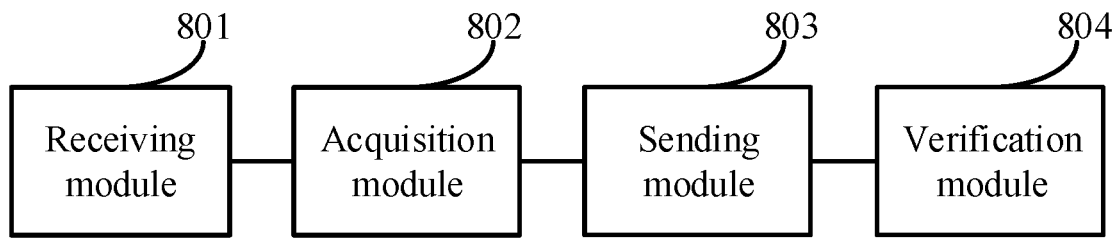
FIG. 8 is a schematic structural diagram illustrating an implementation of an information verification apparatus according to the present specification.

The above is the information verification method provided in the implementations of the present specification. Based on the same idea, as shown in FIG. 8, this implementation of the present specification further provides an information verification apparatus.

The information verification apparatus includes: a receiving module 801, an acquisition module 802, a sending module 803, and a verification module 804.

The receiving module 801 is configured to receive a communication verification request of a user, the communication verification request being used to verify whether a communication account of the user is abnormal.

The acquisition module 802 is configured to obtain first biometric feature data inputted by the user, and perform biometric feature verification on the user based on the first biometric feature data.

The sending module 803 is configured to obtain pre-stored benchmark biometric feature data of the user if the biometric feature verification on the user succeeds, and send first check information corresponding to the benchmark biometric feature data and a target token corresponding to a pre-stored communication account of the user to a serving end, so that the serving end determines a verification result of the communication account based on the first check information, the target token, and second check information that corresponds to the pre-stored benchmark biometric feature data of the user.

The verification module 804 is configured to receive the verification result sent by the serving end, and determine, based on the verification result, whether the communication account of the user is abnormal.

In this implementation of the present specification, the apparatus further includes: a data acquisition module, configured to obtain the pre-stored benchmark biometric feature data of the user after communication verification between the user and the serving end succeeds, and send the second check information that corresponds to the benchmark biometric feature data to the serving end; and a token receiving module, configured to receive and store the target token that is sent by the serving end and that corresponds to the communication account of the user, where the target token is generated based on information about a client of the user and the communication account of the user.

In this implementation of the present specification, the data acquisition module is configured to: generate, in a TEE, an encryption key and a decryption key that correspond to the second check information; and send the decryption key and the second check information to the serving end; and the sending module 803 is configured to: sign the first check information and the target token based on the encryption key to obtain signed target data, and send the signed target data to the serving end, so that the serving end determines the verification result of the communication account based on the signed target data and the second check information that corresponds to the pre-stored benchmark biometric feature data of the user.

In this implementation of the present specification, the token receiving module is configured to: receive the target token that is sent by the serving end and that corresponds to the communication account of the user, encrypt the target token based on the encryption key, and store the encrypted target token into the TEE; and the sending module 803 is configured to: decrypt the stored encrypted target token based on the decryption key to obtain the decrypted target token, and send the decrypted target token to the serving end.

In this implementation of the present specification, the apparatus further includes: an information receiving module, configured to receive and store target verification information that is sent by the serving end and that corresponds to the information about the client and the communication account of the user, where the target verification information is generated based on a predetermined random number generation algorithm; and the data acquisition module is configured to: sign the first check information, the target verification information, and the target token based on the encryption key to obtain the signed target data.

According to the information verification apparatus provided in this implementation of the present specification, the first biometric feature data inputted by the user is obtained by receiving the communication verification request of the user, where the communication verification request is used to verify whether the communication account of the user is abnormal; and biometric feature verification is performed on the user based on the first biometric feature data. The pre-stored benchmark biometric feature data of the user is obtained if the biometric feature verification on the user succeeds, and the first check information corresponding to the benchmark biometric feature data and the target token corresponding to the pre-stored communication account of the user are sent to the serving end, so that the serving end determines the verification result of the communication account based on the first check information, the target token, and the second check information that corresponds to the pre-stored benchmark biometric feature data of the user. The verification result sent by the serving end is received, and whether the communication account of the user is abnormal is determined based on the verification result. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 9

Figure 9:
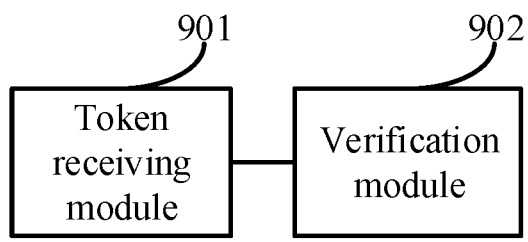
FIG. 9 is a schematic structural diagram illustrating an implementation of another information verification apparatus according to the present specification.

The above is the information verification method provided in the implementations of the present specification. Based on the same idea, as shown in FIG. 9, this implementation of the present specification further provides an information verification apparatus.

The information verification apparatus includes a token receiving module 901 and a verification module 902.

The token receiving module 901 is configured to receive first check information and a target token that are sent by the client, the first check information being check information corresponding to benchmark biometric feature data of a user pre-stored by the client, and the target token being a token corresponding to a communication account of the user pre-stored by the client.

The verification module 902 is configured to determine a verification result of the communication account based on the first check information, the target token, and second check information that corresponds to the pre-stored benchmark biometric feature data of the user, and send the verification result to the client, so that the client determines, based on the verification result, whether the communication account of the user is abnormal.

In this implementation of the present specification, the apparatus further includes: an information receiving module, configured to: after communication verification on the communication account of the user succeeds, receive and store the second check information that corresponds to the benchmark biometric feature data; and a token generation module, configured to generate the target token based on information about the client and the communication account of the user, and send the target token to the client.

In this implementation of the present specification, the apparatus further includes: a key receiving module, configured to receive and store a decryption key that is generated by the client in a TEE and that corresponds to the second check information.

The token receiving module 901 is configured to: receive signed target data sent by the client, where the signed target data is data obtained after the client signs the first check information and the target token based on an encryption key, and the encryption key is a key that is generated by the client in the TEE and that corresponds to the decryption key.

The verification module 902 is configured to: perform signature verification on the signed target data based on the decryption key; and determine, when the signature verification on the signed target data succeeds, the verification result of the communication account based on the first check information, the target token, and the second check information that corresponds to the pre-stored benchmark biometric feature data of the user.

In this implementation of the present specification, the verification module 902 is configured to: when the signature verification on the signed target data succeeds and the first check information successfully matches the second check information, determine the verification result based on the target token, the information about the client, and a communication number of the user.

According to the information verification apparatus provided in this implementation of the present specification, the first check information and the target token that are sent by the client are received, where the first check information is check information corresponding to the benchmark biometric feature data of the user pre-stored by the client, and the target token is a token corresponding to the communication account of the user pre-stored by the client. The verification result of the communication account is determined based on the first check information, the target token, and the second check information that corresponds to the pre-stored benchmark biometric feature data of the user, and the verification result is sent to the client, so that the client determines, based on the verification result, whether the communication account of the user is abnormal. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 10

Figure 10:
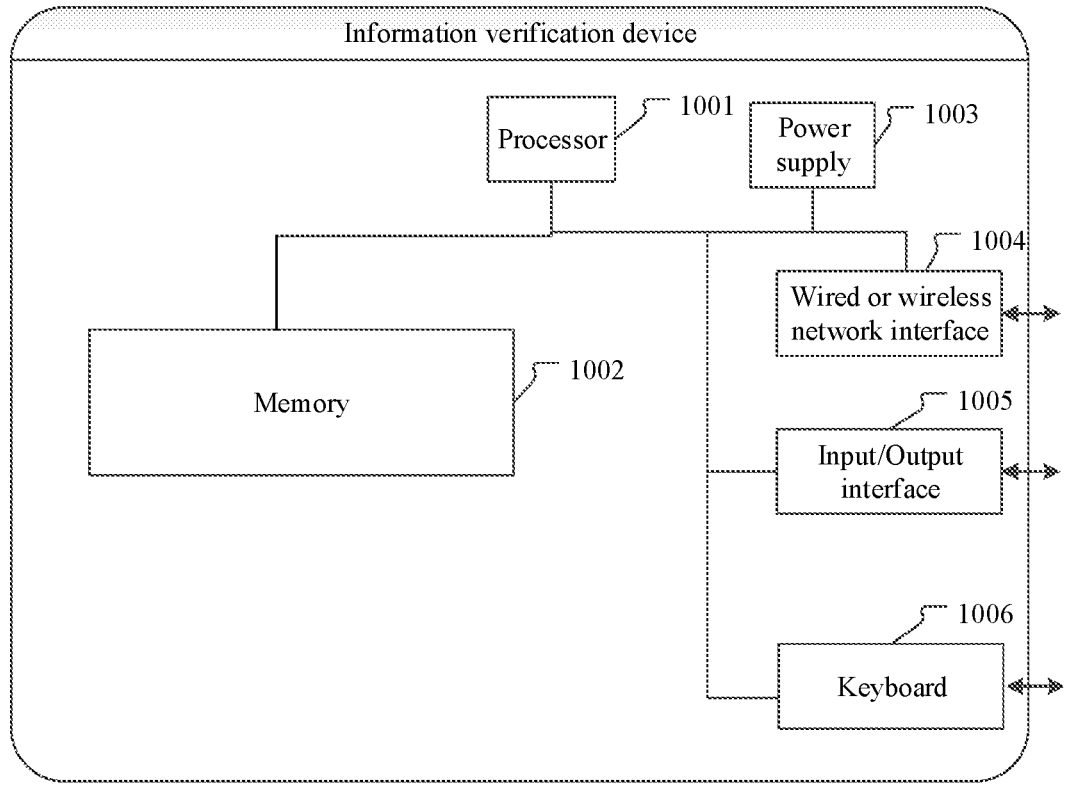
FIG. 10 is a schematic structural diagram illustrating an information verification device according to the present specification.

Based on the same idea, as shown in FIG. 10, this implementation of the present specification further provides an information verification device.

The information verification device can be the client provided in the above implementations.

The information verification device can differ greatly due to different configurations or different performance, and can include one or more processors 1001 and a memory 1002. The memory 1002 can store one or more application programs or data. The memory 1002 can be used for transient storage or persistent storage. The application program stored in the memory 1002 can include one or more modules (not shown in the figure), and each module can include a series of computer executable instructions for the information verification device. Further, the processor 1001 can be configured to communicate with the memory 1002, and execute the series of computer executable instructions in the memory 1002 on the information verification device. The information verification device can further include one or more power supplies 1003, one or more wireless network interfaces 1004, one or more input/output interfaces 1005, and one or more keyboards 1004.

Specifically, in this implementation, the information verification device includes a memory and one or more programs. The one or more programs are stored in the memory. The one or more programs can include one or more modules, and each module can include a series of computer executable instructions for the information verification device. One or more processors are configured to execute the following computer executable instructions included in the one or more programs: receiving a communication verification request of a user, the communication verification request being used to verify whether a communication account of the user is abnormal; obtaining first biometric feature data inputted by the user, and performing biometric feature verification on the user based on the first biometric feature data; obtaining pre-stored benchmark biometric feature data of the user if the biometric feature verification on the user succeeds, and sending first check information corresponding to the benchmark biometric feature data and a target token corresponding to a pre-stored communication account of the user to a serving end, so that the serving end determines a verification result of the communication account based on the first check information, the target token, and second check information that corresponds to the pre-stored benchmark biometric feature data of the user; and receiving the verification result sent by the serving end, and determining, based on the verification result, whether the communication account of the user is abnormal.

In some embodiments, before the pre-stored benchmark biometric feature data of the user is obtained if the biometric feature verification on the user succeeds, the following is further included: obtaining the pre-stored benchmark biometric feature data of the user after communication verification between the user and the serving end succeeds, and sending the second check information that corresponds to the benchmark biometric feature data to the serving end; and receiving and storing the target token that is sent by the serving end and that corresponds to the communication account of the user, where the target token is generated based on information about the client of the user and the communication account of the user.

In some embodiments, sending the second check information that corresponds to the benchmark biometric feature data to the serving end includes: generating, in a TEE, an encryption key and a decryption key that correspond to the second check information; and sending the decryption key and the second check information to the serving end; and where sending the first check information corresponding to the benchmark biometric feature data and the target token corresponding to the pre-stored communication account of the user to the serving end includes: signing the first check information and the target token based on the encryption key to obtain signed target data, and sending the signed target data to the serving end, so that the serving end determines the verification result of the communication account based on the signed target data and the second check information that corresponds to the pre-stored benchmark biometric feature data of the user.

In some embodiments, receiving and storing the target token that is sent by the serving end and that corresponds to the communication account of the user includes: receiving the target token that is sent by the serving end and that corresponds to the communication account of the user, encrypting the target token based on the encryption key, and storing the encrypted target token into a trusted execution environment; and sending the target token corresponding to the pre-stored communication account of the user to the serving end includes: decrypting the stored encrypted target token based on the decryption key to obtain the decrypted target token, and sending the decrypted target token to the serving end.

In some embodiments, after the target token generated by the serving end based on the information about the client and the communication account of the user is received and stored, the following is further included: deleting the stored target token when detecting that the communication account of the user is changed.

In some embodiments, before the first check information and the target token are signed based on the encryption key to obtain a corresponding digital signature, and the digital signature, the first check information, and the target token are sent to the serving end, the following is further included: receiving and storing target verification information that is sent by the serving end and that corresponds to the information about the client and the communication account of the user, where the target verification information is generated based on a predetermined random number generation algorithm; and signing the first check information and the target token based on the encryption key to obtain the signed target data includes: signing the first check information, the target verification information, and the target token based on the encryption key to obtain the signed target data.

According to the information verification device provided in this implementation of the present specification, the first biometric feature data inputted by the user is obtained by receiving the communication verification request of the user, where the communication verification request is used to verify whether the communication account of the user is abnormal; and biometric feature verification is performed on the user based on the first biometric feature data. The pre-stored benchmark biometric feature data of the user is obtained if the biometric feature verification on the user succeeds, and the first check information corresponding to the benchmark biometric feature data and the target token corresponding to the pre-stored communication account of the user are sent to the serving end, so that the serving end determines the verification result of the communication account based on the first check information, the target token, and the second check information that corresponds to the pre-stored benchmark biometric feature data of the user. The verification result sent by the serving end is received, and whether the communication account of the user is abnormal is determined based on the verification result. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 11

Figure 11:
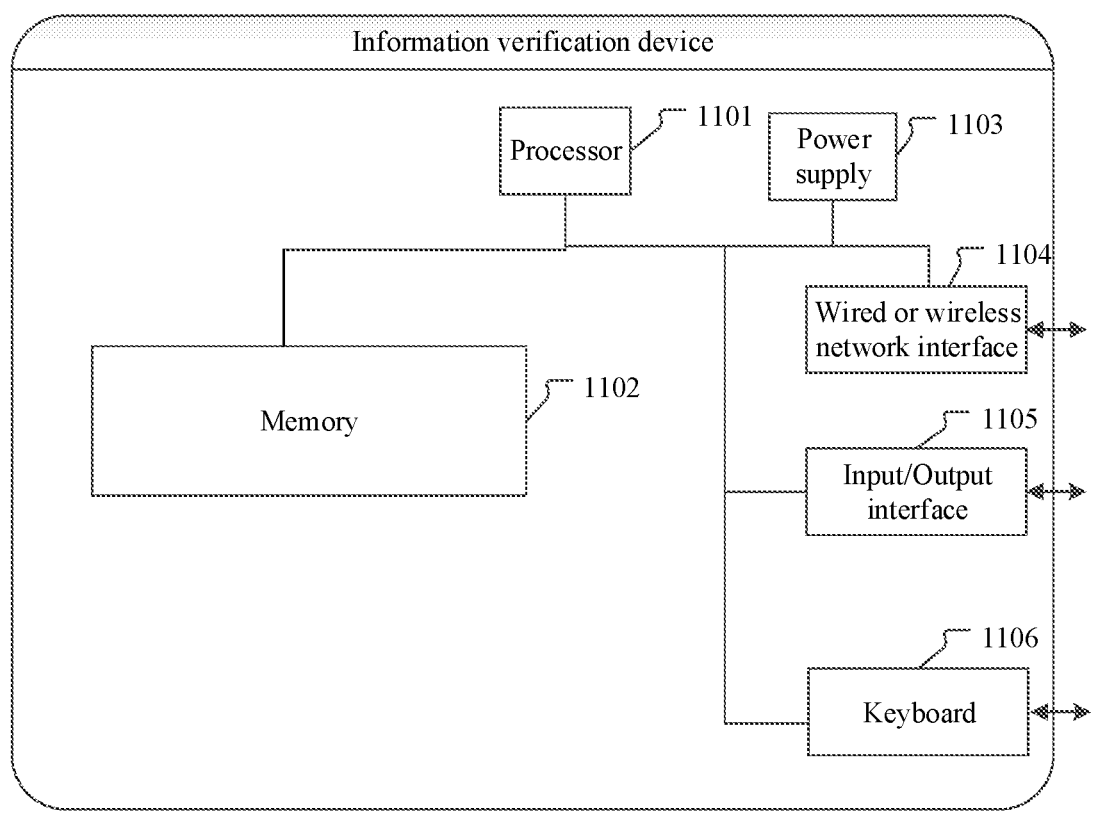
FIG. 11 is a schematic structural diagram illustrating another information verification device according to the present specification.

Based on the same idea, as shown in FIG. 11, this implementation of the present specification further provides an information verification device.

The information verification device can be the serving end provided in the above implementations.

The information verification device can differ greatly due to different configurations or different performance, and can include one or more processors 1101 and a memory 1102. The memory 1102 can store one or more application programs or data. The memory 1102 can be used for transient storage or persistent storage. The application program stored in the memory 1102 can include one or more modules (not shown in the figure), and each module can include a series of computer executable instructions for the information verification device. Further, the processor 1101 can be configured to communicate with the memory 1102, and execute the series of computer executable instructions in the memory 1102 on the information verification device. The information verification device can further include one or more power supplies 1103, one or more wireless network interfaces 1104, one or more input/output interfaces 1105, and one or more keyboards 1104.

Specifically, in this implementation, the information verification device includes a memory and one or more programs. The one or more programs are stored in the memory. The one or more programs can include one or more modules, and each module can include a series of computer executable instructions for the information verification device. One or more processors are configured to execute the following computer executable instructions included in the one or more programs: receiving first check information and a target token that are sent by the client, the first check information being check information corresponding to benchmark biometric feature data of a user pre-stored by the client, and the target token being a token corresponding to a communication account of the user pre-stored by the client; and determining a verification result of the communication account based on the first check information, the target token, and second check information that corresponds to the pre-stored benchmark biometric feature data of the user, and sending the verification result to the client, so that the client determines, based on the verification result, whether the communication account of the user is abnormal.

In some embodiments, before the first check information and the target token that are sent by the client are received, the following is further included: after communication verification on the communication account of the user succeeds, receiving and storing the second check information that corresponds to the benchmark biometric feature data; and generating the target token based on information about the client and the communication account of the user, and sending the target token to the client.

In some embodiments, before the verification result is determined based on the first check information, the target token, and the second check information that corresponds to the pre-stored benchmark biometric feature data of the user, the following is further included: receiving and storing a decryption key that is generated by the client in a TEE and that corresponds to the second check information; receiving the first check information and the target token that are sent by the client includes: receiving signed target data sent by the client, where the signed target data is data obtained after the client signs the first check information and the target token based on an encryption key, and the encryption key is a key that is generated by the client in the TEE and that corresponds to the decryption key; and the determining the verification result of the communication account based on the first check information, the target token, and the second check information that corresponds to the pre-stored benchmark biometric feature data of the user includes: performing signature verification on the signed target data based on the decryption key; and determining, when the signature verification on the signed target data succeeds, the verification result of the communication account based on the first check information, the target token, and the second check information that corresponds to the pre-stored benchmark biometric feature data of the user.

In some embodiments, the determining, when the signature verification on the signed target data succeeds, the verification result based on the first check information, the target token, and the second check information that corresponds to the pre-stored benchmark biometric feature data of the user includes: when the signature verification on the signed target data succeeds and the first check information successfully matches the second check information, determining the verification result based on the target token, the information about the client, and a communication number of the user.

According to the information verification device provided in this implementation of the present specification, the first check information and the target token that are sent by the client are received, where the first check information is check information corresponding to the benchmark biometric feature data of the user pre-stored by the client, and the target token is a token corresponding to the communication account of the user pre-stored by the client. The verification result of the communication account is determined based on the first check information, the target token, and the second check information that corresponds to the pre-stored benchmark biometric feature data of the user, and the verification result is sent to the client, so that the client determines, based on the verification result, whether the communication account of the user is abnormal. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

Implementation 12

This implementation of the present specification further provides a computer readable storage medium. The computer readable storage medium stores a computer program. When the computer program is executed by a processor, various processes in the information verification method implementations are implemented, and the same technical effects can be achieved. To avoid repetition, details are omitted herein for simplicity. The computer readable storage medium can be, for example, a read-only memory (ROM), a random access memory (RAM), a magnetic disk, or an optical disk.

According to the computer readable storage medium provided in this implementation of the present specification, the first biometric feature data inputted by the user is obtained by receiving the communication verification request of the user, where the communication verification request is used to verify whether the communication account of the user is abnormal; and biometric feature verification is performed on the user based on the first biometric feature data. The pre-stored benchmark biometric feature data of the user is obtained if the biometric feature verification on the user succeeds, and the first check information corresponding to the benchmark biometric feature data and the target token corresponding to the pre-stored communication account of the user are sent to the serving end, so that the serving end determines the verification result of the communication account based on the first check information, the target token, and the second check information that corresponds to the pre-stored benchmark biometric feature data of the user. The verification result sent by the serving end is received, and whether the communication account of the user is abnormal is determined based on the verification result. As such, whether the communication account of the user is abnormal can be determined by using the first check information and the pre-stored second check information, thereby avoiding a problem of high verification costs and low verification efficiency caused because an SMS verification code needs to be generated for each communication verification request when the communication account is verified by using an SMS verification code. Moreover, because verification is performed with reference to the target token, the verification accuracy can also be improved. In conclusion, the verification efficiency and the verification accuracy can be improved.

The above describes the specific implementations of the present specification. Other implementations are within the scope of the appended claims. In some cases, the actions or steps described in the claims can be performed in an order different from that in the implementations and still can achieve desired results. In addition, the processes described in the accompanying drawings do not necessarily require the specific shown order or the sequential order to achieve the desired results. In some implementation manners, multitasking and parallel processing are also possible or can be advantageous.

In the 1990s, an improvement to a technology could be clearly distinguished between a hardware improvement (for example, an improvement to a circuit structure of a diode, a transistor, or a switch) and a software improvement (an improvement to a method process). However, with the development of technologies, improvements to many current methods and processes can be considered as direct improvements to hardware circuit structures. Designers almost always get a corresponding hardware circuit structure by programming an improved method procedure into a hardware circuit. Therefore, it cannot be considered that the improvement to a method procedure cannot be realized by a hardware entity module. For example, a programmable logic device (PLD) (such as a field programmable gate array (FPGA)) is such an integrated circuit whose logic function is determined by programming performed by a user on a device. A designer performs programming to "integrate" a digital system on a PLD without requiring a chip manufacturer to design and manufacture a dedicated integrated circuit chip. Moreover, nowadays, instead of manually making integrated circuit chips, this type of programming is often realized by using "logic compiler" software, which is similar to a software compiler used in program development and writing, but original code before compilation needs to be written in a specific programming language, which is referred to as a hardware description language (HDL). There is not only one type of HDL, but there are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Currently, the most commonly used programming languages are Very-High-Speed Integrated Circuit Hardware Description Language (VHDL) and Verilog. A person skilled in the art should be clearly aware that just a little bit of logic programming on the method procedure in the above hardware description languages and programming into an integrated circuit can easily obtain a hardware circuit for implementing the logic method procedure.

A controller can be implemented in any suitable way. For example, the controller can be in a form of, for example, a microprocessor, a processor, a computer-readable medium storing computer-readable program code (for example, software or firmware) executable by the (micro) processor, a logic gate, a switch, an application-specific integrated circuit (ASIC), a programmable logic controller, or an embedded microcontroller. Examples of the controller include, but are not limited to, the following microcontrollers: ARC 425D, Atmel AT91SAM, Microchip PIC18F24K20, and Silicon Labs C8051F320. A memory controller can be implemented as part of memory control logic. A person skilled in the art also knows that in addition to implementing the controller by using purely computer-readable program code, it is entirely possible to program the method steps to make the controller achieve the same functions in a form of a logic gate, a switch, an application-specific integrated circuit, a programmable logic controller, an embedded microcontroller, or the like. Therefore, such a controller can be considered as a hardware component, and apparatuses included in the controller and configured to implement various functions can also be considered as a structure within the hardware component; or even, apparatuses configured to implement various functions can be considered as both a software module for implementing the method and a structure within a hardware component.

The systems, apparatuses, modules, or units described in the above implementations can be implemented by a computer chip or an entity, or can be implemented by a product with a certain function. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of several of these devices.

For ease of description, the above apparatus is divided into various units based on functions, and the units are described separately. Certainly, when one or more implementations of the present specification are implemented, functions of each unit can be implemented in the same one or more pieces of software and/or hardware.

A person skilled in the art should understand that the implementations of the present specification can provide a method, a system, or a computer program product. Therefore, the one or more implementations of the present specification can be in a form of complete hardware implementations, complete software implementations, or software and hardware combined implementations. In addition, the one or more implementations of the present specification can be in a form of computer program products implemented on one or more computer usable storage media (including but not limited to a magnetic disk storage, a CD-ROM, an optical storage, and the like) that include computer usable program code.

The implementations of the present specification are described with reference to at least one of flowcharts or block diagrams illustrating the method, the device (system), and the computer program product according to the implementations of the present specification. It should be understood that at least one of each procedure or each block in at least one of flowcharts or block diagrams, and a combination of at least one of a procedure or a block in at least one of flowcharts or block diagrams can be implemented by computer program instructions. These computer program instructions can be provided to a processor of a general-purpose computer, a special-purpose computer, an embedded processor, or another programmable data processing device to generate a machine, so that the instructions executed by the processor of the computer or the another programmable data processing device generate an apparatus configured to implement functions specified in at least one of one or more procedures in the flowcharts or one or more blocks in the block diagrams.

These computer program instructions can also be stored in a computer-readable memory that guides a computer or another programmable data processing device to work in a particular way, so that the instructions stored in the computer-readable memory generate an article of manufacture including an instruction apparatus. The instruction apparatus implements functions specified in at least one of one or more procedures in the flowcharts or one or more blocks in the block diagrams.

These computer program instructions can alternatively be loaded to a computer or another programmable data processing device, so that a series of operation steps are performed on the computer or the another programmable device to generate processing implemented by the computer. In this way, instructions executed on the computer or the another programmable device provide steps used to implement functions specified in at least one of one or more procedures in the flowcharts or one or more blocks in the block diagrams.

In a typical configuration, a computing device includes one or more processors (CPU), an input/output interface, a network interface, and a memory.

The memory can include at least one of a non-permanent memory in a computer-readable medium, a random access memory (RAM), or a non-volatile memory, such as a read-only memory (ROM) or a flash memory (flash RAM). The memory is an example of the computer-readable medium.

The computer-readable medium includes permanent and non-permanent media and removable and non-removable media, and information can be stored by using any method or technology. The information can be a computer-readable instruction, a data structure, a program module, or other data. Examples of the computer storage medium include, but are not limited to, a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a disk storage, a tape or disk storage, or another magnetic storage device or any another non-transmission medium, which can be configured to store information that can be accessed by the computing device. According to the definition in the present specification, the computer-readable medium does not include transitory media, such as a modulated data signal and carrier.

It should further be noted that the terms "comprise," "include" or any other variants thereof are intended to cover non-exclusive inclusion, so that a process, method, commodity or device including a series of elements not only includes those elements, but also includes other elements that are not explicitly listed, or also includes elements inherent to such a process, method, commodity, or device. If there are no more restrictions, the element defined by the sentence "including a . . . " does not exclude the existence of other identical elements in the process, method, commodity, or device that includes the element.

A person skilled in the art should understand that the implementations of the present specification can provide a method, a system, or a computer program product. Therefore, the one or more implementations of the present specification can be in a form of complete hardware implementations, complete software implementations, or software and hardware combined implementations. In addition, the one or more implementations of the present specification can be in a form of computer program products implemented on one or more computer usable storage media (including but not limited to a magnetic disk storage, a CD-ROM, an optical storage, and the like) that include computer usable program code.

The one or more implementations of the present specification can be described in a general context of computer executable instructions that can be executed by a computer, for example, in a program module. Generally, the program module includes a routine, a program, an object, a component, a data structure, and the like that perform specific tasks or implement specific abstract data types. Alternatively, the one or more implementations of the present specification can be practiced in distributed computing environments. In these distributed computing environments, tasks are executed by remote processing devices connected through a communication network. In the distributed computing environments, the program module can be located in local and remote computer storage media including storage devices.

The various implementations of the present specification are described in a progressive way, and the same or similar parts between the various implementations can be referred to each other, and each implementation focuses on the differences from other implementations. Especially, because the system implementation is basically similar to the method implementation, the system implementation is described relatively simply. For a related part, reference can be made to a part of description of the method implementation.

The above is merely implementations of the present specification, and is not intended to limit the present specification. For a person skilled in the art, the present specification can have various modifications and changes. Any modification, equivalent replacement, improvement, and the like made within the spirit and principle of the present specification shall be included in the scope of the claims of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An information verification method, comprising:
receiving and storing a target token that is sent by a server and that corresponds to a communication account of a user, wherein the target token is generated based on information about a client device of the user and the communication account of the user;
receiving a communication verification request associated with the user, the communication verification request requesting to verify whether the communication account of the user is abnormal;
obtaining first biometric feature data inputted by the user, and performing biometric feature verification on the user based on the first biometric feature data;
obtaining benchmark biometric feature data of the user in response to a success of the biometric feature verification and after communication verification between the user and the server succeeds, sending second check information that corresponds to the benchmark biometric feature data to the server, and sending first check information corresponding to the benchmark biometric feature data and the target token corresponding to the communication account of the user to the server, for the server to determine a verification result of the communication account based on the first check information, the target token, and the second check information that corresponds to the benchmark biometric feature data of the user; and
receiving the verification result sent by the server, and determining, based on the verification result, whether the communication account of the user is abnormal.

2. The method according to claim 1, wherein sending the second check information that corresponds to the benchmark biometric feature data to the server includes:
generating, in a trusted execution environment, an encryption key and a decryption key that correspond to the second check information; and
sending the decryption key and the second check information to the server;
and wherein sending the first check information corresponding to the benchmark biometric feature data and the target token corresponding to the communication account of the user to the server includes:
signing the first check information and the target token based on the encryption key to obtain signed target data; and
sending the signed target data to the server, so that the server determines the verification result of the communication account based on the signed target data and the second check information that corresponds to the benchmark biometric feature data of the user.

3. The method according to claim 2, wherein receiving and storing the target token that is sent by the server and that corresponds to the communication account of the user includes:
receiving the target token, encrypting the target token based on the encryption key, and storing the encrypted target token into a trusted execution environment (TEE);
and wherein sending the target token corresponding to the pre-stored communication account of the user to the server includes:
decrypting the stored encrypted target token based on the decryption key to obtain a decrypted target token, and sending the decrypted target token to the server.

4. The method according to claim 2, further comprising:
before signing the first check information and the target token based on the encryption key to obtain the signed target data, and sending the signed target data to the server,
receiving and storing target verification information that is sent by the server and that corresponds to the information about the client device and the communication account of the user, wherein the target verification information is generated based on a random number generation algorithm;
and wherein signing the first check information and the target token based on the encryption key to obtain the signed target data includes:
signing the first check information, the target verification information, and the target token based on the encryption key to obtain the signed target data.

5. The method according to claim 1, further comprising:
after receiving and storing the target token, deleting the stored target token responsive to detecting that the communication account of the user is changed.

6. An information verification method, comprising:
generating a target token based on information about a client device and a communication account of a user, and sending the target token to the client device;

receiving first check information and the target token that are sent by the client device, wherein the first check information is check information corresponding to benchmark biometric feature data of the user associated with the client device, and the target token is a token corresponding to the communication account of the user;

after communication verification on the communication account of the user succeeds, receiving and storing second check information that corresponds to the benchmark biometric feature data;

determining a verification result of the communication account based on the first check information, the target token, and second check information that corresponds to the benchmark biometric feature data of the user; and sending the verification result to the client device, so that the client device determines, based on the verification result, whether the communication account of the user is abnormal.

7. The method according to claim 6, further comprising:
before determining the verification result based on the first check information, the target token, and the second check information that corresponds to the pre-stored benchmark biometric feature data of the user, receiving and storing a decryption key that is generated by the client device in a trusted execution environment (TEE) and that corresponds to the second check information;
wherein receiving the first check information and the target token that are sent by the client device includes:
receiving signed target data sent by the client device, wherein the signed target data is data obtained after the client device signs the first check information and the target token based on an encryption key, and the encryption key is a key that is generated by the client device in the TEE and that corresponds to the decryption key; and wherein determining the verification result of the communication account based on the first check information, the target token, and the second check information that corresponds to the benchmark biometric feature data of the user includes:
performing signature verification on the signed target data based on the decryption key; and
determining, in response to a success of the signature verification on the signed target data, the verification result of the communication account based on the first check information, the target token, and the second check information that corresponds to the benchmark biometric feature data of the user.

8. The method according to claim 6, wherein determining the verification result based on the first check information, the target token, and the second check information includes:
in response to the success of the signature verification on the signed target data and a successful matching between the first check information and the second check information, determining the verification result based on the target token, the information about the client device, and a communication number of the user.

9. A non-transitory computer readable medium storing contents that, when executed by one or more processors, cause the one or more processors to perform actions comprising:
receiving and storing a target token that is sent by a server and that corresponds to a communication account of a user, wherein the target token is generated based on information about a client device of the user and the communication account of the user;
receiving a communication verification request associated with the user, the communication verification request requesting to verify whether the communication account of the user is abnormal;
obtaining first biometric feature data inputted by the user, and performing biometric feature verification on the user based on the first biometric feature data;
obtaining benchmark biometric feature data of the user in response to a success of the biometric feature verification and after communication verification between the user and the server succeeds, sending second check information that corresponds to the benchmark biometric feature data to the server, and sending first check information corresponding to the benchmark biometric feature data and the target token corresponding to the communication account of the user to the server, for the server to determine a verification result of the communication account based on the first check information, the target token, and the second check information that corresponds to the benchmark biometric feature data of the user; and
receiving the verification result sent by the server, and determining, based on the verification result, whether the communication account of the user is abnormal.

10. The computer readable medium according to claim 9, wherein sending the second check information that corresponds to the benchmark biometric feature data to the server includes:
generating, in a trusted execution environment, an encryption key and a decryption key that correspond to the second check information; and
sending the decryption key and the second check information to the server;
and wherein sending the first check information corresponding to the benchmark biometric feature data and the target token corresponding to the communication account of the user to the server includes:
signing the first check information and the target token based on the encryption key to obtain signed target data; and
sending the signed target data to the server, so that the server determines the verification result of the communication account based on the signed target data and the second check information that corresponds to the benchmark biometric feature data of the user.

11. The computer readable medium according to claim 10, wherein receiving and storing the target token that is sent by the server and that corresponds to the communication account of the user includes:
receiving the target token, encrypting the target token based on the encryption key, and storing the encrypted target token into a trusted execution environment (TEE);
and wherein sending the target token corresponding to the pre-stored communication account of the user to the server includes:
decrypting the stored encrypted target token based on the decryption key to obtain a decrypted target token, and sending the decrypted target token to the server.

12. The computer readable medium according to claim 10, wherein the actions further comprise:
before signing the first check information and the target token based on the encryption key to obtain the signed target data, and sending the signed target data to the server, receiving and storing target verification information that is sent by the server and that corresponds to the information about the client device and the communication account of the user, wherein the target verification information is generated based on a random number generation algorithm;

and wherein signing the first check information and the target token based on the encryption key to obtain the signed target data includes:

signing the first check information, the target verification information, and the target token based on the encryption key to obtain the signed target data.

13. The computer readable medium according to claim 9, wherein the actions further comprise:

after receiving and storing the target token, deleting the stored target token responsive to detecting that the communication account of the user is changed.

14. A non-transitory computer readable medium storing contents that, when executed by one or more processors, cause the one or more processors to perform actions comprising:

generating a target token based on information about a client device and a communication account of a user, and sending the target token to the client device;

receiving first check information and the target token that are sent by the client device, wherein the first check information is check information corresponding to benchmark biometric feature data of the user associated with the client device, and the target token is a token corresponding to the communication account of the user;

after communication verification on the communication account of the user succeeds, receiving and storing second check information that corresponds to the benchmark biometric feature data;

determining a verification result of the communication account based on the first check information, the target token, and second check information that corresponds to the benchmark biometric feature data of the user; and sending the verification result to the client device, so that the client device determines, based on the verification result, whether the communication account of the user is abnormal.

15. The computer readable medium according to claim 14, wherein the actions further comprise:

before determining the verification result based on the first check information, the target token, and the second check information that corresponds to the pre-stored benchmark biometric feature data of the user, receiving and storing a decryption key that is generated by the client device in a trusted execution environment (TEES and that corresponds to the second check information;

wherein receiving the first check information and the target token that are sent by the client device includes:

receiving signed target data sent by the client device, wherein the signed target data is data obtained after the client device signs the first check information and the target token based on an encryption key, and the encryption key is a key that is generated by the client device in the TEE and that corresponds to the decryption key; and wherein determining the verification result of the communication account based on the first check information, the target token, and the second check information that corresponds to the benchmark biometric feature data of the user includes:

performing signature verification on the signed target data based on the decryption key; and determining, in response to a success of the signature verification on the signed target data, the verification result of the communication account based on the first check information, the target token, and the second check information that corresponds to the benchmark biometric feature data of the user.

16. The computer readable medium according to claim 14, wherein determining the verification result based on the first check information, the target token, and the second check information includes:

in response to the success of the signature verification on the signed target data and a successful matching between the first check information and the second check information, determining the verification result based on the target token, the information about the client device, and a communication number of the user.

* * * * *

UNITED STATES PATENT AND TRADEMARK OFFICE
CERTIFICATE OF CORRECTION

PATENT NO. : 11,283,614 B2
APPLICATION NO. : 17/356233
DATED : March 22, 2022
INVENTOR(S) : Yitao Song Page 1 of 1

It is certified that error appears in the above-identified patent and that said Letters Patent is hereby corrected as shown below:

In the Claims

Column 32, Claim 15, Line 8:
"execution environment (TEES" should read: --execution environment (TEE)--.

Signed and Sealed this
Twenty-fourth Day of October, 2023

Katherine Kelly Vidal
*Director of the United States Patent and Trademark Office*